Dec. 8, 1925.

W. SCHWARZENHAUER

ELECTRIC TOY COOKING STOVE

Filed Feb. 20, 1925

1,565,209

Patented Dec. 8, 1925.

1,565,209

UNITED STATES PATENT OFFICE.

WALDEMAR SCHWARZENHAUER, OF ELTERSDORF, GERMANY.

ELECTRIC TOY COOKING STOVE.

Application filed February 20, 1925. Serial No. 10,652.

*To all whom it may concern:*

Be it known that I, WALDEMAR SCHWARZENHAUER, a citizen of the German Republic, residing at Eltersdorf, Germany, have invented certain new and useful Improvements in Electric Toy Cooking Stoves, of which the following is a specification.

The electric toy cooking stoves of known type comprise generally two or more heating elements when they are intended not only for cooking but also for baking and roasting. Electric switches serve for switching in any one of these heating elements or all the heating elements at the same time. The manufacture of such toy kitchen stoves is naturally expensive when compared with that of toy cooking stoves with only one single heating element designed to heat the top plate. Owing to the unnecessary excessive heating the consumption of current is much greater in the toy cooking stove having several heating elements than is good for the connecting terminals in private houses, quite apart from the extra cost of current.

These inconveniences are obviated, according to the present invention, by providing the toy cooking stove with only one heating element which, however, can be used not only for cooking purposes but also for baking or roasting. With this object in view the heating element is mounted on a U-shaped member adapted to be turned around the baking tube and further adapted to be adjusted with regard to the top plate and to the baking tube. The circuit arrangements are considerably simplified and the consumption of current is reduced since only the single heating element has to be supplied with current whatever the kind of heating may be.

An embodiment of the invention is shown by way of example, on the accompanying drawing, in which.

Figure 1:
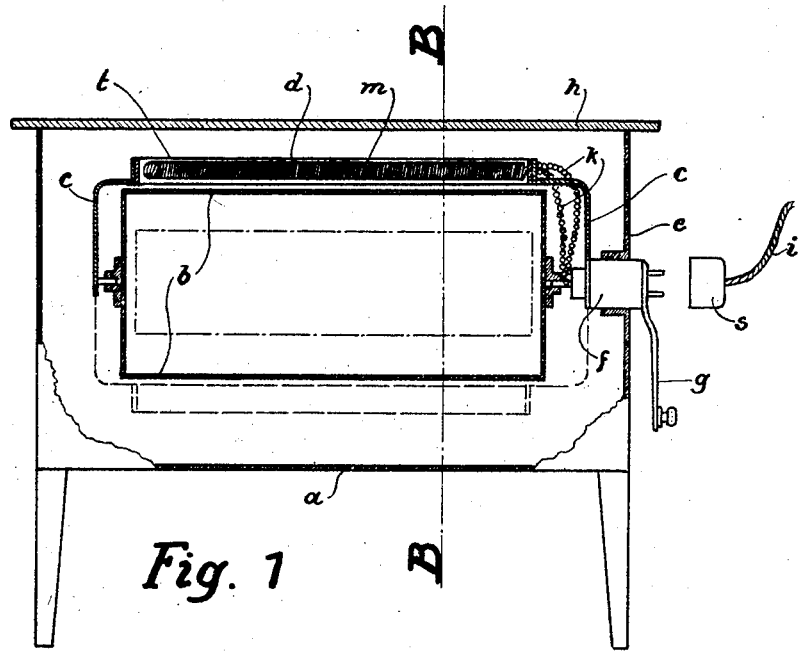
Fig. 1 shows the improved toy cooking stove in a section on line A—A of Fig. 2.
Figure 2:
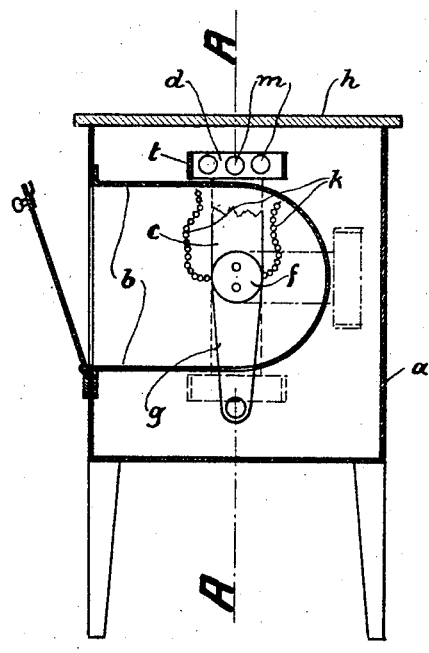
Fig. 2 is a section on line B—B of Fig. 1 the switch lever being shown.

In the toy cooking stove $a$ made of metal a baking tube $b$ is arranged the top and bottom walls of which are parallel to one another, whilst the rear wall is curved round in a semi-circle. A U-shaped member pivotally mounted on the two side walls of the baking tube $b$ comprises two flat leg members $c$ and a frame shaped member $t$ fixed between the upper ends of said flat leg members $c$. In the frame-shaped member an insulated heating spiral $m$ is mounted, consisting of many turns of wire. The frame $t$ with the heating wire $m$ forms a flat like heating member $d$. Any other kind of flat heating member may be used which is fixed on the U-shaped member made in one piece. In the end wall $e$ of the toy kitchen stove $a$ a contact plug $f$ fixed to one end of said bow is pivotally mounted in the direction of the pivot axis of the bow $c, t$. On the outer end of said U-shaped plug $f$ a switch lever $g$ is fixed. The contact plug $f$ is connected to the heating element $d$ by two wires $k$.

When the switch lever $g$ is in the position shown on the drawing the heating element $d$ is in the top position underneath the top plate $h$ so that pans placed on this plate can be heated whilst at the same time top heat is furnished for the articles in the baking tube $b$. If the switch lever $g$ is turned through 180° so as to point upwards the heating element $d$ comes into the position indicated by dotted lines so that the articles being baked or roasted are heated by bottom heat. If the switch lever $g$ be turned towards the front the heating element $d$ comes into the position indicated in dash- and dot lines and heats the baking tube $b$ from the back and in the central zone. To start the toy cooking stove all that is needed is to push the plug $s$ of the lead-in cable $i$ into the contact pins of the plug $f$ and to turn the switch lever into the desired position.

I claim:—

1. An electric toy cooking stove with only one single heating element comprising in combination with a baking tube in the toy cooking stove having the usual top plate, a U-shaped member pivotally mounted on the side walls of said baking tube, a flat frame-shaped heating element on the top of said U-shaped member, and means for rotating said U-shaped member from the outer side of the cooking stove to bring said heating element to any desired position with regard to the top plate and the baking tube.

2. An electric toy cooking stove with only one single heating element, comprising in combination with a baking tube in the toy cooking stove having the usual top plate, two arms pivotally mounted one on each side wall of said baking tube, a flat frame-shaped heating element fixed between the upper ends of said pivotal arms, and means for rotating said U-shaped member from the outer side of the cooking stove to bring said heating element to any desired position with regard to the top plate and the baking tube.

3. An electric toy cooking stove with only one single heating element, comprising in combination with a baking tube in the toy cooking stove having the usual top plate, a U-shaped member pivotally mounted on the side walls of said baking tube, a flat frame-shaped heating element on the top of said U-shaped member, a contact on one end of said U-shaped member in the end wall of the toy cooking stove in the direction of the pivot axis of said U-shaped member and electrically connected with said heating element, and a switch lever on the outer end of said contact plug.

In testimony whereof I affix my signature.

WALDEMAR SCHWARZENHAUER.